(No Model.) 2 Sheets—Sheet 2.
J. A. WETMORE.
TROLLEY WHEEL FOR ELECTRIC RAILWAYS.
No. 459,848. Patented Sept. 22, 1891.
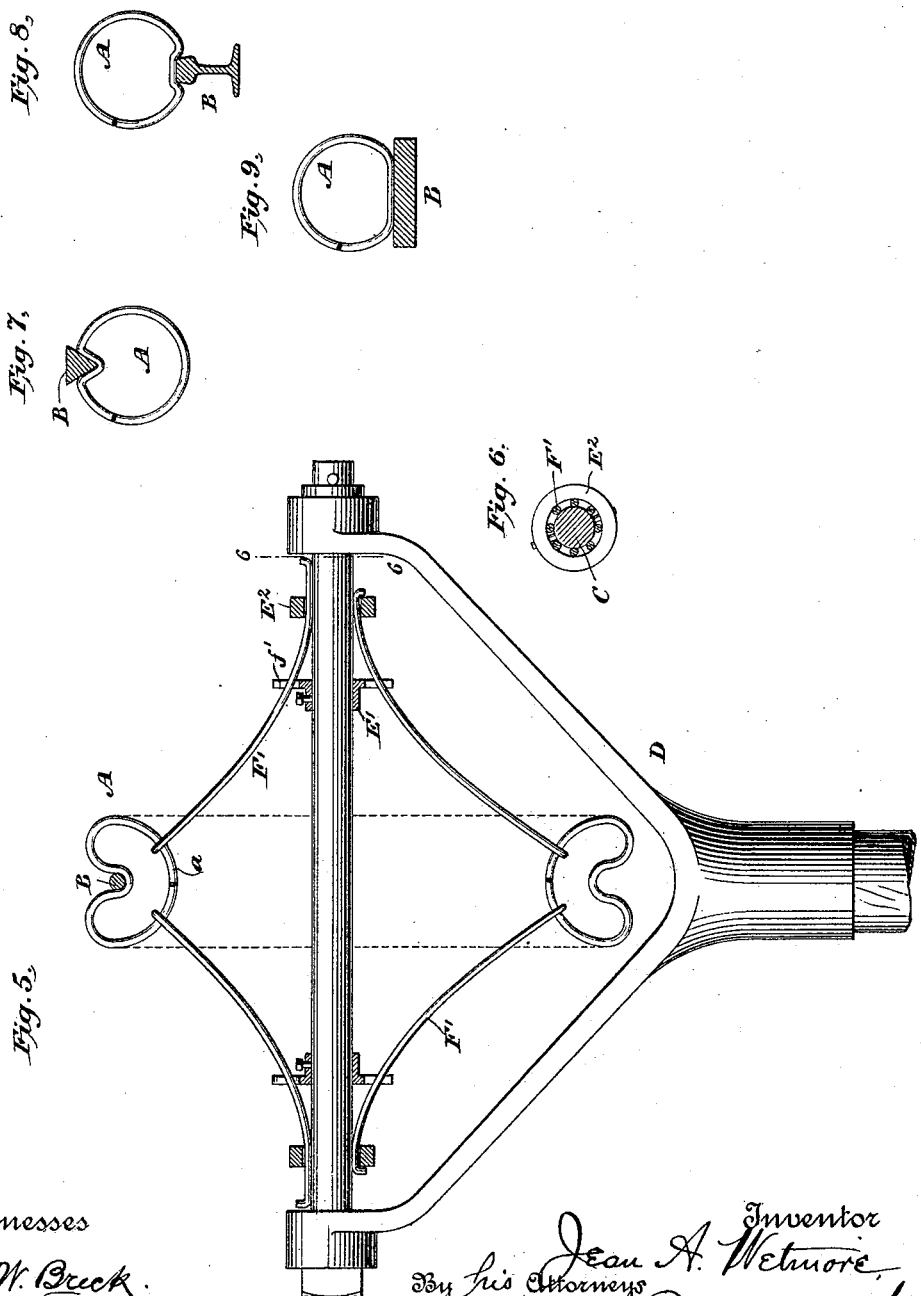
Witnesses
Geo. W. Breck
Edward Thorpe
Inventor
Jean A. Wetmore,
By his Attorneys
Baldwin, Davidson & Wight

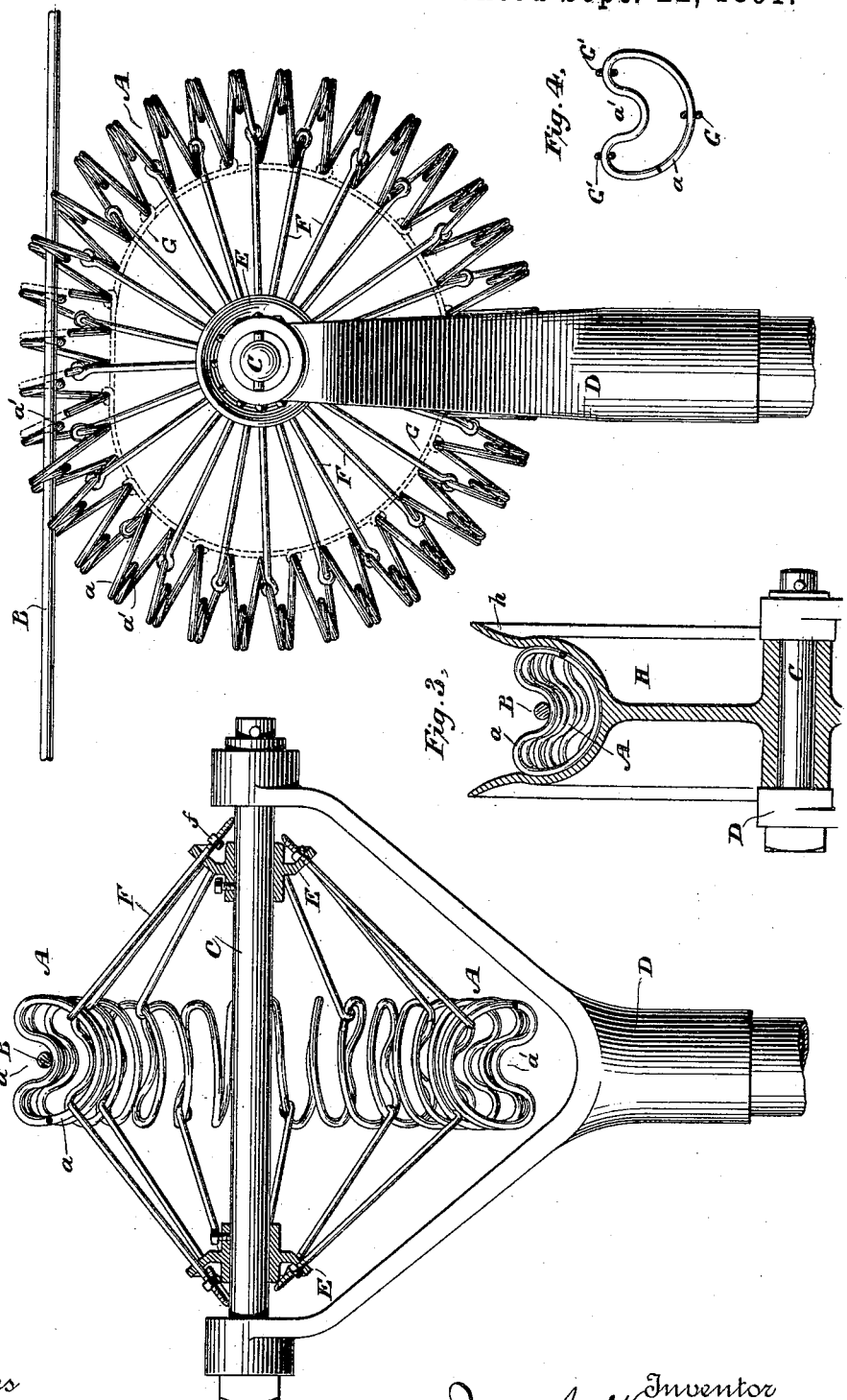

UNITED STATES PATENT OFFICE.

JEAN A. WETMORE, OF BROOKLYN, NEW YORK.

TROLLEY-WHEEL FOR ELECTRIC RAILWAYS.

SPECIFICATION forming part of Letters Patent No. 459,848, dated September 22, 1891.

Application filed February 4, 1891. Serial No. 380,168. (No model.)

*To all whom it may concern:*

Be it known that I, JEAN A. WETMORE, a citizen of the United States, residing at Brooklyn, in the county of Kings and State of New York, have invented certain new and useful Improvements in Electrical Contact-Wheels, of which the following is a specification.

My invention is applicable to all cases where an electric current is to be applied to or taken from a conductor or rail, either in an underground conduit on the surface of the ground or overhead through the medium of a revolving wheel.

The purpose of the invention is to provide a contact-wheel which will give multiple contacts with the conductor or rail upon which it travels the sum of which shall be materially greater in area than the extent of contact that can possibly be obtained with an ordinary wheel. By such an arrangement sparking, due to the incomplete or insufficient area of contact and consequent resistance in the circuit and oxidation and destruction of the surfaces, is avoided.

The primary feature of my invention consists in forming the conducting-wheel of a spirally-wound conductor of round or other cross-section the individual convolutions of which are capable of yielding under the pressure of the wheel upon the rail or conductor in contact with which it is rotating, whereby multiple convolutions are caused to make contact with the rail or conductor, thereby affording the proper and sufficient area of contact to convey the current without sparking.

Another feature of my invention consists in conforming the periphery of the wheel to the conductor or rail in contact with which it rotates. Thus the periphery may be flat if the wheel is to run upon a flat surface, or may have an annular depression in its periphery of greater or less extent and in shape adapted to receive the rail or conductor against which the wheel bears. The periphery of the wheel formed, as stated, of a spirally-wound conductor may be separated upon its hub or rotating shaft by yielding arms that permit not only the compression or yielding of the individual convolutions, but also a bodily yielding of the wheel, or the spirally-wound periphery may be seated in the recessed periphery of a rigid wheel.

In the accompanying drawings, Figure 1 is a sectional view, and Fig. 2 a side elevation, of my improved device. Fig. 3 is a detail sectional view of that form of the device in which the tire or periphery composed of spirally-wound wire is seated in the recessed periphery of a rigid wheel. Fig. 4 is a detail view showing how the convolutions of the wire or conductor may be braced by wires or strips connecting the convolutions either on the periphery or the interior of the wheel. Fig. 5 is an elevation, partly in section, of a somewhat modified construction; Fig. 6, a detail sectional view on the line 6 6 of Fig. 5; and Figs. 7, 8, and 9 are detail views showing different formations of the periphery of the spirally-formed wheel.

In the several figures the wheel proper or tire A is shown as composed of a spirally-wound electrical conductor of suitable cross-section, with that part of the periphery that is to run in contact with the rail or conductor suitably formed to receive or run upon the rail or conductor. This may readily be accomplished by winding the conductor composing the wheel A on a suitable core, to the shape of which the wire is conformed. Thus in Figs. 1, 2, 3, and 5 the individual convolutions $a$ of the conductor forming the wheel are depressed or curved inwardly to form an annular recess $a'$ in the periphery of the wheel, which recess can be curved at the bottom and is adapted especially for the reception of a round conductor or rail B. As shown in Figs. 1 and 3, this annular depression in the periphery of the wheel may be of such width that the conductor B will have more or less play laterally therein; or, as shown in Fig. 5, it may be of such limited width that its curved wall tends somewhat to grasp the conductor laterally, the tendency being for the individual wires $a$ to contact and press against the sides of the conductor because of the pressure of the wheel against the conductor.

C represents the shaft of the wheel, shown as suitably mounted in a bifurcated metal head D, which may form part of the circuit in which the wheel is being used. Two perforated disks E, secured to the shaft near each bearing by set-screws, receive and guide conducting-links F, which are connected with the convolutions $a$, pass each through an aperture in one of the disks E, and may be screw-threaded upon their ends for the reception of nuts $f$, which serve to limit their outward endwise movement through the apertures in the disks. As seen from Figs. 1 and 2, the pressure of the wheel against the conductor or rail B causes the individual convolutions to yield, thereby producing a partial flattening of the wheel at the point of contact, thus affording multiple contacts, as described. This motion is permitted by the links F, connected with the depressed convolutions, moving inward through the apertures in the disks E, while at the opposite side of the wheel the links F will draw out to the limit permitted by the nuts $f$. There is therefore a bodily yielding of the wheel, as well as the yielding of the individual convolutions.

In order to strengthen or stiffen the wheel, the individual convolutions may be connected on the interior of the wheel by a wire G, as indicated in Fig. 4 and by dotted lines in Fig. 2; or wires G' may similarly connect the convolutions of the periphery of the wheel, as indicated in Fig. 4.

In Fig. 5 the convolutions of the wheel are connected with the shaft by flexing links F'. These links are curved somewhat inwardly, so that in yielding they tend to move toward the shaft. The links pass through notches or slots $f'$ in disks E', keyed to the shaft, and then pass between the shaft and collars $E^2$, fixed on the shaft, the ends of the yielding rods occupying the annular space between the shaft and collar. The rods or links at all times tend to press firmly against the shaft and make good electrical contact therewith. When the wheel is depressed upon one side, as described, the rods or links F" yield and thrust endwise along the shaft, as clearly shown. On the opposite sides of the wheel the rods tend to draw out from the collars to permit the yielding of the wheel, before described.

In Fig. 7 the annular depression in the periphery of the wheel is V-shaped for the reception of a correspondingly-shaped rail or conductor. In Fig. 8 the bottom of the depression in the periphery is flat and adapted to run upon a flat rail. In Fig. 9 the periphery is not recessed, but is flattened and adapted to run upon the flat rail or conductor B. Where the periphery is depressed or recessed the walls of the recess form guides for the conductor or rail.

In Fig. 3 the wheel or tire A is seated in the recess periphery of a rigid wheel H, the bottom of which is curved to conform to the curves of the individual convolutions of the conductor forming the wheel or tire, and its side walls are curved to embrace and grip the correspondingly-curved sides of the tire. The tire or wheel A is therefore firmly held in position. The peripheral flanges $h$ of the wheel H may extend considerably beyond the tire A, so as to more or less protect it and afford a guard to prevent the conductor B from becoming disengaged from the wheel. In this construction the multiple contacts are afforded by the yielding of the individual convolutions only.

I am aware that heretofore it has been proposed to construct a trolley-wheel in such manner as to afford multiple contacts with the conductor against which the wheel rotates. I am also aware that it has heretofore been proposed to apply upon the periphery of a wheel two spirals of wire between which the conductor with which the wheel is to make contact passes.

I claim as my invention—

1. An electrical contact wheel or tire composed of a single spiral formed of a spirally-wound electrical conductor and having its periphery adapted to run upon or in contact with a rail or conductor, substantially as set forth.

2. An electrical contact wheel or tire formed of a spirally-wound conductor and having in its periphery an annular depression or recess adapted to receive the conductor or rail in contact with which the wheel is to rotate.

3. An electrical contact wheel or tire formed of a spirally-wound electrical conductor and having its periphery conformed to the conductor or rail in contact with which it is to rotate.

4. The combination of a supporting shaft or hub, a wheel or tire composed of a spirally-wound electrical conductor, and yielding connections between said wheel and the shaft or hub.

5. The combination of a shaft or hub, the contact-wheel composed of a spirally-wound electrical conductor and flexing endwise movable rods or links electrically connecting said wheel and the shaft or hub.

6. The combination of a shaft or hub, the contact-wheel composed of a spirally-wound conductor, and flexing connections between the shaft or hub and wheel, which permit the yielding of the wheel and its individual convolutions, substantially as set forth.

7. The combination of a shaft or hub, a contact-wheel composed of a spirally-wound electrical conductor, and yielding connections connecting the individual convolutions of the conductor with the hub or wheel, substantially as described.

8. The combination of the shaft or hub, a contact-wheel consisting of a spirally-wound electrical conductor, a bracing wire or strip connecting the individual convolutions of the wheel, and yielding connections between the shaft or hub and wheel.

In testimony whereof I have hereunto subscribed my name.

JEAN A. WETMORE.

Witnesses:
EDWARD C. DAVIDSON,
MAMIE J. KELLEY.